United States Patent Office 2,800,406
Patented July 23, 1957

2,800,406

PROCESS FOR MAKING MANGANESE-BEARING STEELS

David Swan, Lewiston, N. Y., assignor to Union Carbide Corporation, a corporation of New York No Drawing. Application November 10, 1953, Serial No. 391,393

1 Claim. (Cl. 75—133)

This invention relates to a process for making manganese bearing steels, and more particularly, concerns the recovery of reducible oxides containing manganese and chromium from an alloy steel slag.

Heretofore, several difficulties have been encountered in the production of stainless steel, especially of the manganese-bearing stainless steel type. One of the most important of these difficulties concerns the loss of reducible oxides in the slag. For example, in making a heat of manganese-bearing stainless steel in an electric furnace, a large proportion of the chromium and manganese is included in the slag and is not available in the finished steel product. In effect, this action increases the expense of producing and manufacturing stainless steels, particularly in the case where a high manganese and high chromium content is desired.

In order that manganese-bearing steels may be produced at greater production rates in a less expensive manner, it is necessary that the manganese and chromium oxide included in the slag be recovered to greater degree than is presently possible using the ordinary mode of recovery, that is, a silicon reducing agent.

To the end that the above set forth difficulty may be avoided, there is provided herein an improved method for the production of manganese-bearing steels and the recovery of reducible oxides from slag wherein the melt down charge containing steel scrap of a predetermined proportion is processed in a basic lined furnace having a slag layer of controlled base to acid ratio, and wherein the melt down charge is subjected to a reducing process comprising the addition of a reduction batch having silicomanganese and freshly kilned lime therein. The reduction batch, operating in a slag of the proper base-acid ratio, acts to reduce the oxides in the slag thereby recovering manganese metal therefrom.

It is, therefore, an important object of the present invention to improve on the existing practice of alloying manganese steel alloys in order to increase the efficiency of production, particularly with respect to the reduction of oxides in the slag, to provide a metal tap with maximum amount of metal per unit of melting charge.

Another important object of the present invention is to produce a chrome-manganese-nickel steel in a simple, efficient, economical and thoroughly practical manner employing manganese steel scrap, a major portion including primarily chrome-manganese-nickel steel, and using inexpensive and available agents such as low phosphorus, low carbon silicomanganese metal to reduce the oxides in the slag, all with a minimum consumption of power and labor.

Still an other important object of the present invention is to provide an improved method for producing manganese-bearing stainless steels by the addition of silicon and manganese as reducing agent for an oxidized slag.

Yet another important object of the present invention is to provide a unique single slag method of making manganese-bearing steels employing a silicomanganese alloy as a reducing agent in a slag having a base to acid ratio of at least 1½ to 1, so that a smaller and more manageable volume of slag is encountered and a higher metal recovery is obtained from the slag.

Other objects, features, and advantages of the present invention will be apparent from the following detailed description:

In accordance with the principles and features embodied in my invention I produce manganese-bearing steels of the stainless steel variety by charging manganese-bearing scrap into a furnace, the initial bath being decarburized by conventional means and the resultant manganese-bearing slag reduced by using a special low phosphorus, low carbon silicomanganese reducing agent. The manganese acts as a base, thus permitting reduction to take place without the necessity of adding excessive quantities of lime or other inert bases. This results in a smaller slag volume, thus increasing the manganese recovery as well as the recovery of any other oxidizable materials present in the slag.

As a specific example of the practice of my invention in producing a manganese alloy, I conveniently melt together quantities of scrap steel using a conventional basic lined electric furnace.

The melt down charge to be used in my process may employ approximately 50% manganese-bearing steels, as for example chrome-manganese-nickel steel scrap, preferably having about 5% to 10% manganese. Any deficiency in the manganese content in the scrap may be made up by the addition of ferro-manganese, manganese metal or manganese ore, so that the resultant steel melt would be comparable to a typical chrome-manganese-nickel steel of the stainless steel variety in which manganese usually constitutes more than 5% of the alloy composition.

In a representative heat employing the practice of my invention for the production of a one ton tap of manganese-bearing metal having a composition of 18% chromium, 5% manganese, 5% nickel, the balance iron and traces of impurities and other alloying elements, I have found the following analysis and recovery of alloying elements to hold true.

The heat is furnaced by shoveling approximately one-half of the slag batch onto the furnace bottom and covering said slag batch with about one-half of the melt down charge. The balance of the slag batch and melt down charge is fed to the furnace as the charge melts down. For example, in a charge having a total weight of approximately 2150 lbs. exclusive of slag batch and lime additives in my process, the melt down batch comprises 1000 pounds of chrome-manganese-nickel steel scrap, 52 pounds of nickel shot, 80 pounds of pig iron and 600 pounds of steel scrap. The slag consists of 50 pounds of screened lime and 10 pounds of sand.

In order to decrease the carbon content to the low levels desired in stainless steel today, the melt is decarburized preferably by passing oxygen through the molten metal bath. For this purpose a steel lance is used, the lance being so held that the oxygen transmitted thereby impinges upon the steel bath at the slag-metal interface. In the instant example, the oxygen is preferably blown in at 135 p. s. i. for 1¾ minutes after drop of flame.

The aforementioned step results in lowering the carbon content to a desired level, and also results in converting a portion of the chromium and manganese to their oxides. The amount so oxidized is dependent upon the carbon content and temperature of the bath following the oxidation step.

Following the above step, it is customary to recover part of the chromium and manganese in the slag by means of a chemical reduction with silicon or other reducing agents (i. e. aluminum).

In order that my invention may be more clearly understood, it may be noted at this point that in a steel bath using silicon as a reducing agent, silicon has a great affinity for oxygen, with the result that metallic oxides in furnace slag are readily reduced, thereby permitting the attaining of a high metallic recovery. In the use of silicon as a reducing agent, best results are obtained by increasing the base to acid ratio to a high value, usually by adding lime or magnesia. However, as an ineluctable consequence of this, the slag volumes encountered are excessive and at times near unmanageable, and while the percentage of chromium contained in the slag may be low, a large amount is not recovered because of the excessive slag volume. Therefore, a part of my invention consists of establishing an optimum base to acid ratio to achieve minimum losses of chromium and manganese. I have also discovered that the total recovery of both chromium and manganese can be improved by adding a portion of the manganese in conjunction with silicon during the slag reduction period. As a further consequence, the volume of the slag is decreased to manageable proportions.

In accordance with my invention, I add at the end of the oxygen blow, a silicomanganese reduction batch comprising about 134 pounds of special low phosphorus, low carbon silicomanganese metal and about 184 pounds of fresh hot screened lime. A suitable silicomanganese metal to be used in the practice of my invention may have a composition consisting of 30% Si, 60% Mn, 0.05% carbon, and the remainder iron and incidental impurities. The silicomanganese reduction batch may be added to the melt in any conventional manner.

As a means for increasing the chrome content of the melt, a low carbon ferrochromium metal may be added thereto in suitable quantities, the amount depending upon the percentage composition of chromium desired. Any further adjustment of the manganese content may be made by adding low carbon ferromanganese, or manganese metal.

After the steel bath is prepared as above, I charge it with a small silicon reduction batch consisting of 10 pounds of 75% ferro-silicon and about 30 pounds of lime, preferably freshly formed hot screened lime direct from a lime kiln, in order to obtain favorable ingot shrink results and to avoid absorption of hydrogen in the ingot.

Should the silicon level of the bath be too great as a result of the silicon composition of the reduction batches which have been added thereto, suitable means may be taken for substituting equivalent alloys. For example: if an 0.5% silicon level in the tapped metal is too high, it might be lowered by replacing the 75% ferro-silicon with aluminum shot, which would still hold the recovery of manganese and chromium at about the same or higher level depending upon the amount employed.

I have found that the base to acid ratio necessary to expel or win maximum amount of chromium from the furnace slag so as to produce manganese-bearing stainless steels having variously desired manganese and chromium compositions, ranges between 1½ to 1 and 2 to 1, preferably closer to 2 to 1. Further, the amount of chromium recovered from the slag volume is in direct relation to the increase in the basicity of the slag, and the slag volume remaining in the melt decreases in approximately inverse relation to the base to acid ratio increase. Thus in order to obtain high manganese, high chromium content alloys, it is essential that the reduction batch employed contains sufficient basic materials to increase and maintain the base to acid ratio at the minimum value.

It is highly desirable in finishing the above described heat that the base to acid ratio be disturbed as little as possible both during the addition of additives and at the time of tapping in order to minimize the possibility of phosphorus reversion from the slag to the metal. It is believed that the addition of the silicomanganese reduction batch in the proportions enumerated above is least disturbing to this ratio.

As a final step in the production of manganese bearing steels, the slag is permitted to run out of the furnace into a slag pan, and manganese-bearing metal is tapped from the furnace. The metal may be tapped into a magnesia-lined teapot ladle for subsequent reladling or pouring into ingot molds.

The beneficial results obtained by the above described method are revealed in the improved efficiencies obtained in actual practice. This efficiency is the ratio of manganese recovered in the steel as tap metal to the total manganese available in the meltdown charge and reduction batch. An actual run, using the quantities itemized hereinabove, indicates that stainless steel containing 18% Cr, 5% Mn, and 5% Ni can be produced with recovery of more than 75% of the manganese and 95% of the chromium in the tapped metal.

Accordingly it will be seen that my invention provides for the production of a manganese-bearing alloy steel in which the manganese and chromium contents are high, using available, inexpensive silicon-manganese-nickel scrap steels in conjunction with a silicomanganese reducing agent employed with a carefully adjusted base to acid ratio slag. This is to be distinguished from the present conventional expensive practice of smelting manganese alloy steel scrap using silicon as a reducing agent in a high base to acid ratio slag to give a high manganese bearing stainless steel with a relatively lower chromium content, which practice is not as commercially feasible because of the excessive slag volumes encountered as noted above and the concommitant loss of chromium and manganese in the slag volume.

It is to be understood that modification and variations may be effected without departing from the scope of the novel concepts of the present invention.

I claim:

In the process of producing manganese-bearing steels from a molten bath of manganese-bearing steel having an overlying slag layer containing reducible manganese and chromium oxides, the improvement of minimizing the loss of said reducible manganese and chromium oxides in said slag and effective high recovery of the manganese and chromium therein without substantially increasing the slag volume, said improvement comprising adding sufficient lime to impart a base-to-acid ratio between 1.5 to 1 and 2 to 1 to said slag, and while maintaining said base-to-acid ratio, adding manganese to said melt, introducing silicon in conjunction with said added manganese in an amount approximately one-half of the added manganese, thereby achieving substantially maximum recovery of both the chromium and manganese in said slag.

References Cited in the file of this patent

UNITED STATES PATENTS

| | | |
|---|---|---|
| 1,431,621 | Beneker | Oct. 10, 1922 |
| 2,076,885 | Feild | Apr. 13, 1937 |
| 2,557,458 | Ogan | June 19, 1951 |